(12) United States Patent
Zhang et al.

(10) Patent No.: US 11,709,902 B2
(45) Date of Patent: Jul. 25, 2023

(54) RECOMMENDATION METHOD AND APPARATUS, AND STORAGE MEDIUM

(71) Applicant: Tencent Technology (Shenzhen) Company Limited, Guangdong (CN)

(72) Inventors: Xu Zhang, Shenzhen (CN); Leyu Lin, Shenzhen (CN); Kaikai Ge, Shenzhen (CN); Linyao Tang, Shenzhen (CN); Yudan Liu, Shenzhen (CN); Xin Chen, Shenzhen (CN); Su Yan, Shenzhen (CN); Kai Zhuang, Shenzhen (CN); Wei Wang, Shenzhen (CN); Jing Zhang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 184 days.

(21) Appl. No.: 17/183,251

(22) Filed: Feb. 23, 2021

(65) Prior Publication Data

US 2021/0173884 A1 Jun. 10, 2021

Related U.S. Application Data

(63) Continuation of application No. PCT/CN2019/121919, filed on Nov. 29, 2019.

(30) Foreign Application Priority Data

Nov. 29, 2018 (CN) .......................... 201811445266.1

(51) Int. Cl.
*G06F 16/00* (2019.01)
*G06F 16/9535* (2019.01)
(Continued)

(52) U.S. Cl.
CPC ...... *G06F 16/9535* (2019.01); *G06F 16/9536* (2019.01); *G06N 3/08* (2013.01); *G06Q 50/01* (2013.01)

(58) Field of Classification Search
CPC ... G06F 16/9535; G06F 16/9536; G06N 3/08; G06Q 50/01
See application file for complete search history.

(56) References Cited

U.S. PATENT DOCUMENTS

| 2010/0287033 | A1* | 11/2010 | Mathur | ................... H04L 51/02 725/44 |
| 2013/0325560 | A1 | 12/2013 | Kocsor et al. | |
| 2018/0181572 | A1* | 6/2018 | Guo | .................... G06F 16/9535 |

FOREIGN PATENT DOCUMENTS

| CN | 106649842 A | 5/2017 |
| CN | 107767279 A | 3/2018 |

(Continued)

OTHER PUBLICATIONS

Japanese Office Action dated Mar. 30, 2022 in Application No. 2021-527278 with English Translation.

(Continued)

*Primary Examiner* — Hung Q Pham
(74) *Attorney, Agent, or Firm* — ArentFox Schiff LLP

(57) ABSTRACT

A recommendation method is provided. In the method, a candidate item to be recommended to a social network user is obtained. The social network user has at least two different types of social relationships. For at least one target social object in each of the at least two different types of social relationships of the social network user, attention of each of the at least one target social object in the respective type of social relationship to the candidate item is determined. According to the attention of each of the at least one target social object in the at least two different types of social relationships to the candidate item, a comprehensive attention of the target social objects of the at least two different types of social relationships to the candidate item is deter- (Continued)

mined. According to the comprehensive attention, whether to recommend the candidate item to the social network user is determined.

20 Claims, 7 Drawing Sheets

(51) Int. Cl.
G06F 16/9536 (2019.01)
G06N 3/08 (2023.01)
G06Q 50/00 (2012.01)

(56) References Cited

FOREIGN PATENT DOCUMENTS

| CN | 108763314 A | 11/2018 |
|---|---|---|
| CN | 110245301 A | 9/2019 |
| CN | 110351318 A | 10/2019 |
| JP | 2015036856 A | 2/2015 |
| JP | 2016071887 A | 5/2016 |
| JP | 2018181326 A | 11/2018 |

OTHER PUBLICATIONS

International Search Report Issued in Application PCT/CN2019/121919 dated Feb. 18, 2020 with English Translation, (5 pages).
Written Opinion Issued in Application PCT/CN2019/121919 dated Feb. 18, 2020 (4 pages).

* cited by examiner

| WeChat-10k | Recall@10 | Recall@50 | Recall@100 | NDCG@10 | NDCG@50 | NDCG@100 |
|---|---|---|---|---|---|---|
| MP | 0.0685 | 0.1792 | 0.2498 | 0.0456 | 0.0744 | 0.0882 |
| ItemKnn | 0.1444 | 0.3321 | 0.4301 | 0.0911 | 0.1406 | 0.1599 |
| BPR | 0.1881 | 0.3661 | 0.4693 | 0.1220 | 0.1708 | 0.1910 |
| SBPR | 0.1838 | 0.3721 | 0.4733 | 0.1241 | 0.1724 | 0.1928 |
| NCF | 0.1841 | 0.3745 | 0.4746 | 0.1234 | 0.1731 | 0.1945 |
| SAMN | 0.1933 | 0.3916 | 0.4922 | 0.1319 | 0.1825 | 0.2018 |
| SACF | 0.2004** | 0.3965** | 0.4995** | 0.1374** | 0.1892** | 0.2094** |
| WeChat-100k | Recall@10 | Recall@50 | Recall@100 | Recall@10 | Recall@50 | Recall@100 |
| MP | 0.0432 | 0.1009 | 0.1435 | 0.0273 | 0.0418 | 0.0498 |
| ItemKnn | 0.1173 | 0.2609 | 0.3367 | 0.0716 | 0.1078 | 0.1221 |
| BPR | 0.1283 | 0.2673 | 0.3456 | 0.0824 | 0.1177 | 0.1324 |
| SBPR | 0.1294 | 0.2712 | 0.3527 | 0.0832 | 0.1197 | 0.1342 |
| NCF | 0.1288 | 0.2690 | 0.3483 | 0.0821 | 0.1176 | 0.1325 |
| SAMN | 0.1336 | 0.2803 | 0.3639 | 0.0856 | 0.1227 | 0.1384 |
| SACF | 0.1403** | 0.2910** | 0.3758** | 0.0903** | 0.1283** | 0.1442** |

RECOMMENDATION METHOD AND APPARATUS, AND STORAGE MEDIUM

RELATED APPLICATION

This application is a continuation of International Application No. PCT/CN2019/121919, filed on Nov. 29, 2019, which claims priority to Chinese Patent Application No. 201811445266.1, entitled "RECOMMENDATION METHOD AND APPARATUS, AND STORAGE MEDIUM" filed on Nov. 29, 2018. The entire disclosures of the prior applications are hereby incorporated by reference in their entirety.

FIELD OF THE TECHNOLOGY

This application relates to the field of Internet technologies, and includes a recommendation method and apparatus, and a storage medium.

BACKGROUND OF THE DISCLOSURE

Artificial Intelligence (AI) is a theory, a method, a technology, and an application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision technology, a speech processing technology, a natural language processing technology, and machine learning (ML)/deep learning.

ML is a multi-disciplinary subject involving a plurality of disciplines such as probability theory, statistics, approximation theory, convex analysis, and algorithm complexity theory. ML specializes in studying how a computer simulates or implements a human learning behavior to obtain new knowledge or skills, and reorganize an existing knowledge structure to keep improving its performance. ML is a core of the AI, is a basic way to make the computer intelligent, and is applied to various fields of the AI. ML and deep learning generally include technologies such as an artificial neural network, a belief network, reinforcement learning, transfer learning, inductive learning, and learning from demonstrations.

With the continuous development of Internet technology, various types of items on the Internet grow rapidly to meet users' requirements on information in the information era. The item on the Internet is data information, such as commodities, articles, advertisements, and virtual information, used for user consumption, participation, or behavioral interaction on the Internet. However, different users have different requirements on the items. In this way, different items need to be recommended to different users. For example, in some recommendation methods, a user's preference can be mined based on information of a friend of the user.

SUMMARY

Embodiments of this application provide a recommendation method and apparatus, and a non-transitory computer-readable storage medium, to for example improve the accuracy of recommending an item that a user is interest in to the user, and avoid recommending an item that the user is uninterested in to the user for a plurality of times, so that the resource utilization ratio is improved, thereby improving user experience.

According to an aspect, the embodiments of this application provide a recommendation method. In the method, a candidate item to be recommended to a social network user is obtained. The social network user has at least two different types of social relationships. For at least one target social object in each of the at least two different types of social relationships of the social network user, attention of each of the at least one target social object in the respective type of social relationship to the candidate item is determined. According to the attention of each of the at least one target social object in the at least two different types of social relationships to the candidate item, a comprehensive attention of the target social objects of the at least two different types of social relationships to the candidate item is determined. According to the comprehensive attention, whether to recommend the candidate item to the social network user is determined.

According to another aspect, the embodiments of this application provide a recommendation apparatus that includes processing circuitry. The processing circuitry is configured to obtain a candidate item to be recommended to a social network user. The social network user has at least two different types of social relationships. The processing circuitry is configured to determine, for at least one target social object in each of the at least two different types of social relationships of the social network user, attention of each of the at least one target social object in the respective type of social relationship to the candidate item. The processing circuitry is configured to determine, according to the attention of each of the at least one target social object in the at least two different types of social relationships to the candidate item, a comprehensive attention of the target social objects of the at least two different types of social relationships to the candidate item. The processing circuitry is further configured to determine, according to the comprehensive attention, whether to recommend the candidate item to the social network user.

According to still another aspect, the embodiments of this application provide a computing apparatus, including at least one processor and at least one memory, the memory storing a computer program, the computer program, when executed by the processor, causing the processor to perform the operations of the recommendation method in the embodiments of this application.

According to yet another aspect, the embodiments of this application provide a non-transitory computer-readable storage medium storing instructions which when executed by at least one processor cause the at least one processor to perform the operations of the recommendation method in the embodiments of this application According to an exemplary recommendation method provided in the embodiments of this application, when a candidate item to be recommended to a social platform user is obtained, for at least one target social object in each type of social relationship in at least two different types of social relationships of the user on a social platform, a single-item attention of each target social object to the candidate item is respectively determined. That is to make full use of attention information of the social objects having a plurality of social relationships with the user on the social platform to the candidate item. Then, a comprehensive attention of target social objects of different types to the candidate item is determined according to the single-item attention of each target social object to the candidate item. Then whether to recommend the candidate item to the social platform user is determined according to the comprehensive attention. Therefore, the accuracy of recommending an item to the user can be improved, and recommending an item that the user is uninterested in to the user can be avoided as much as possible, thereby improving the resource utilization ratio and user experience.

BRIEF DESCRIPTION OF THE DRAWINGS

To describe the technical solutions in the embodiments of this application or in the related art more clearly, the following briefly describes the accompanying drawings required for describing the embodiments. The accompanying drawings in the following description show merely some embodiments of this application.

DESCRIPTION OF EMBODIMENTS

Figure 1:
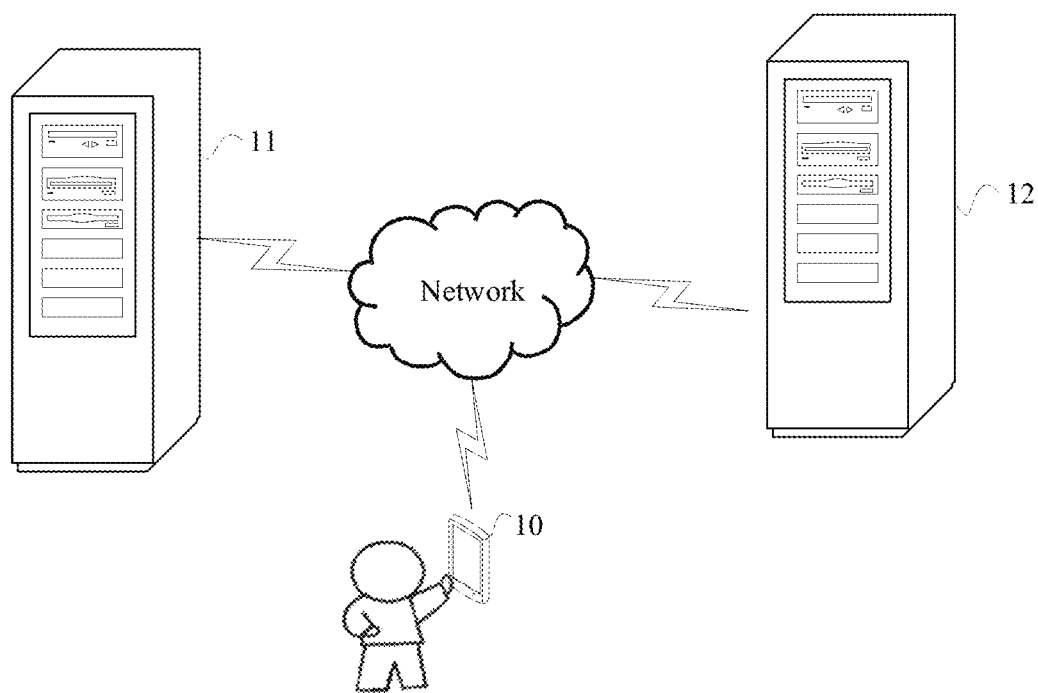
FIG. 1 is a schematic diagram of an application scenario according to an embodiment of this application.

To make the objectives, technical solutions, and advantages of the embodiments of this application clearer, the technical solutions in this application will be described in the following with reference to the accompanying drawings in the embodiments of this application. The described embodiments are merely a part rather than all of the embodiments of the technical solutions of this application. All other embodiments obtained by a person of ordinary skill in the art based on the embodiments recorded in the document of this application shall fall within the protection scope of the technical solutions of this application.

With the study and progress of AI technologies, the AI technology has been studied and applied to many fields, such as a common smart home, a smart wearable device, a virtual assistant, a smart speaker, smart marketing, unmanned driving, automatic driving, an unmanned aerial vehicle, a robot, smart medical care, smart customer service, and speech recognition. It is believed that with the development of technology, the AI technology will be applied to more fields and play a more important and valuable role.

In some recommendation solutions, a user's preference may be determined based on information of a friend of the user, but such methods only consider information of a part of friends of the user. However, the user does not necessarily have the same or similar preferences as that of this part of the friends. Mining the user's preference merely from a perspective of the friend cannot obtain accurate user preference information. Therefore, the foregoing recommendation method has a technical problem that the accuracy of item recommendation is low, which affects user experience.

With the development of social networks, some social platforms and applications allow the user to join a group they are interested in and communicate with a group member. A group activity can reflect a user's interest and complement friend information of the user.

In the item recommendation method provided in the embodiments of this application, in addition to considering the friend information, group information that is highly related to the user's preference is further introduced. Some embodiments of this application provide a social attentional collaborative filtering (SACF) model, which uses the friend information and group information of the user together. Because not all social relationships are equally useful for determining the user's preference, and the model introduces an attention mechanism to distinguish the influence of different friends and groups of the user. In addition, to make better use of the group information, the embodiments of this application further provide an attention model to improve a learning effect of social objects of different social relationships on a to-be-recommended item.

The following describes some concepts involved in the embodiments of this application.

Deep learning is a new field in ML research that aims to establish a neural network that simulates a human brain to analyze and study, and the deep learning mimics the mechanism of the human brain to illustrate data, such as images, sounds, and text.

An attention mechanism is a branch of deep learning, and can also be referred to as a neural attention mechanism, which stems from the study of human vision. In cognitive science, due to the bottleneck of information processing, humans selectively focus on a part of all information while ignoring other visible information. The foregoing mechanism is usually referred to as the attention mechanism. Different parts of a human retina have different levels of information processing capabilities, and only the fovea in the retina has the strongest acuity. To make proper use of a limited visual information processing resource, humans need to select a specific part of a visual area and then focus on the specific part. For example, when people are reading, usually only a small number of words to be read will be paid attention to and processed. In summary, the attention mechanism has two main aspects: deciding which part of an input needs to be paid attention to; and allocating the limited information processing resources to the important part.

An attention is a selection capability that can focus on some information while ignoring some other information.

It is considered in this application that social objects having different social relationships on a social platform have different influences on a user's behavior. For example, when a user needs to buy a pair of basketball shoes, the user may follow a suggestion of a friend who plays basketball; when it comes to travel, the user may turn to a suggestion of a friend on the social platform who likes to travel. The friend who plays basketball or likes to travel of the user may be a friend having a friend relationship with the user on the social platform, or may be a member having a group relationship with the user in a group joined by the user. Therefore, when recommending an item to the user, attention information of the social objects having different social relationships with the user on the social platform to the item can be taken into consideration to improve the accuracy of recommending an item to the user.

Further, considering that a learning advantage that the attention mechanism has shown in various ML tasks, the attention mechanism can be introduced into an item recommendation field, to learn a "usefulness" of various social relationships of the user on the social platform to item comment, thereby further improving the accuracy of recommending an item to the user. Further, when this application introduces the attention mechanism into an item recommendation method, different influences of the social objects in different social relationships on the social platform on the user's behavior is considered, and an attention model that is suitable for learning an attention of the social objects having different social relationships to the to-be-recommended item is designed for the social objects having different social relationships based on the attention mechanism, to improve a learning effect of the social objects having different social relationships to the to-be-recommended item. For example, when the social relationship is a group relationship, considering that different group members in the group have different activity levels, and a more active group member has a greater influence and a high importance level on the group. Attention information of the group member of a high importance level in the group to the candidate item has more influence on an interest of the user to the candidate item. Therefore, an importance weight of each group member in the group is combined in the introduced attention mechanism, to learn or determine an attention of the group to the item, and improve the accuracy of the attention of the group, obtained by learning, to the item, thereby improving the accuracy of recommending an item to the user.

Based on this, the embodiments of this application provide an item recommendation method. According to the method, when a candidate item to be recommended to a social platform user is obtained, for at least one target social object in each type of social relationship in at least two different types of social relationships of the user on a social platform, a single-item attention of each target social object to the candidate item is respectively determined. That is to make full use of attention information of the social objects having a plurality of social relationships with the user on the social platform to the candidate item. Then, a comprehensive attention of target social objects of different types to the candidate item is determined according to the single-item attention of each target social object to the candidate item. The single-item attention of each target social object to the candidate item is obtained by the attention model training based on the attention mechanism. That is, the learning advantage of the attention mechanism is fully utilized to accurately learn the single-item attention of each target social object to the candidate item. Then, whether to recommend the candidate item to the social platform user is determined according to the comprehensive attention. Therefore, the accuracy of recommending an item to the user can be improved, and recommending an item that the user is uninterested in to the user can be avoided, so that the resource utilization ratio is improved, thereby improving user experience.

The item recommendation method provided in the embodiments of this application may be applied to an application scenario shown in FIG. 1. The application scenario includes a user terminal 10 and an item recommendation computing apparatus. In the embodiment shown in FIG. 1, the item recommendation computing apparatus may be an item recommendation server device 11. The item recommendation server device 11 may be a server device, or may be a server device cluster formed by several server devices or a cloud computing center. In an implementation, the item recommendation server device 11 shown in FIG. 1 may include the computing apparatus shown in FIG. 10.

The user terminal 10 may be any smart terminal device, such as a computer, an iPad, or a mobile phone, that can run according to a program and process a large amount of data automatically and at a high speed. A social application (APP), such as WeChat or QQ, corresponding to the social platform in this embodiment of this application is installed on the user terminal 10, and other types of APPs may alternatively be installed on the user terminal 10. The social APP is provided with a back-end server device that supports the social APP to run. The back-end server device may be a server device, or a server device cluster formed by several server devices or a cloud computing center. The back-end server device that supports the social APP to run and the item recommendation server device 11 may be integrated to become an integrated server device cluster, or may be a server device independent of each other shown in FIG. 1. A reference numeral of the back-end server device that supports the social APP to run shown in FIG. 1 is 12.

The user terminal 10 is respectively connected to the back-end server device 12 that supports the social APP to run and the item recommendation server device 11 by using a network, and the back-end server device 12 that supports the social APP to run is connected to the item recommendation server device 11 by using the network, so that the user terminal 10, the back-end server device 12 that supports the social APP to run, and the item recommendation server device 11 can communicate with each other. The network may be any one of communication networks such as a local area network, a wide area network, and a mobile Internet.

In this embodiment of this application, the item recommendation method may be applied to the item recommendation server device. When a candidate item to be recommended to the social platform user is obtained, the item recommendation server device may respectively determine, for at least one target social object in each type of social relationship in at least two different types of social relationships of the social platform user on a social platform, a single-item attention of the target social object to the candidate item; determine, according to the single-item attention of each target social object to the candidate item, a comprehensive attention of target social objects of different types to the candidate item; determine, according to the comprehensive attention, whether to recommend the candidate item to the social platform user; and interact with the back-end server device that supports the social platform in a case of determining to recommend the candidate item to the social platform user, thereby presenting the recommended candidate item to the social platform user by using the social platform in the user terminal.

The foregoing application scenario is illustrated merely for ease of understanding of the spirits and principles of this application, and the embodiments of this application are not limited in this aspect. The embodiments of this application can be applied to any applicable scenario.

The item recommendation method provided in this embodiment of this application is described below with reference to the application scenario shown in FIG. 1.

Figure 2:
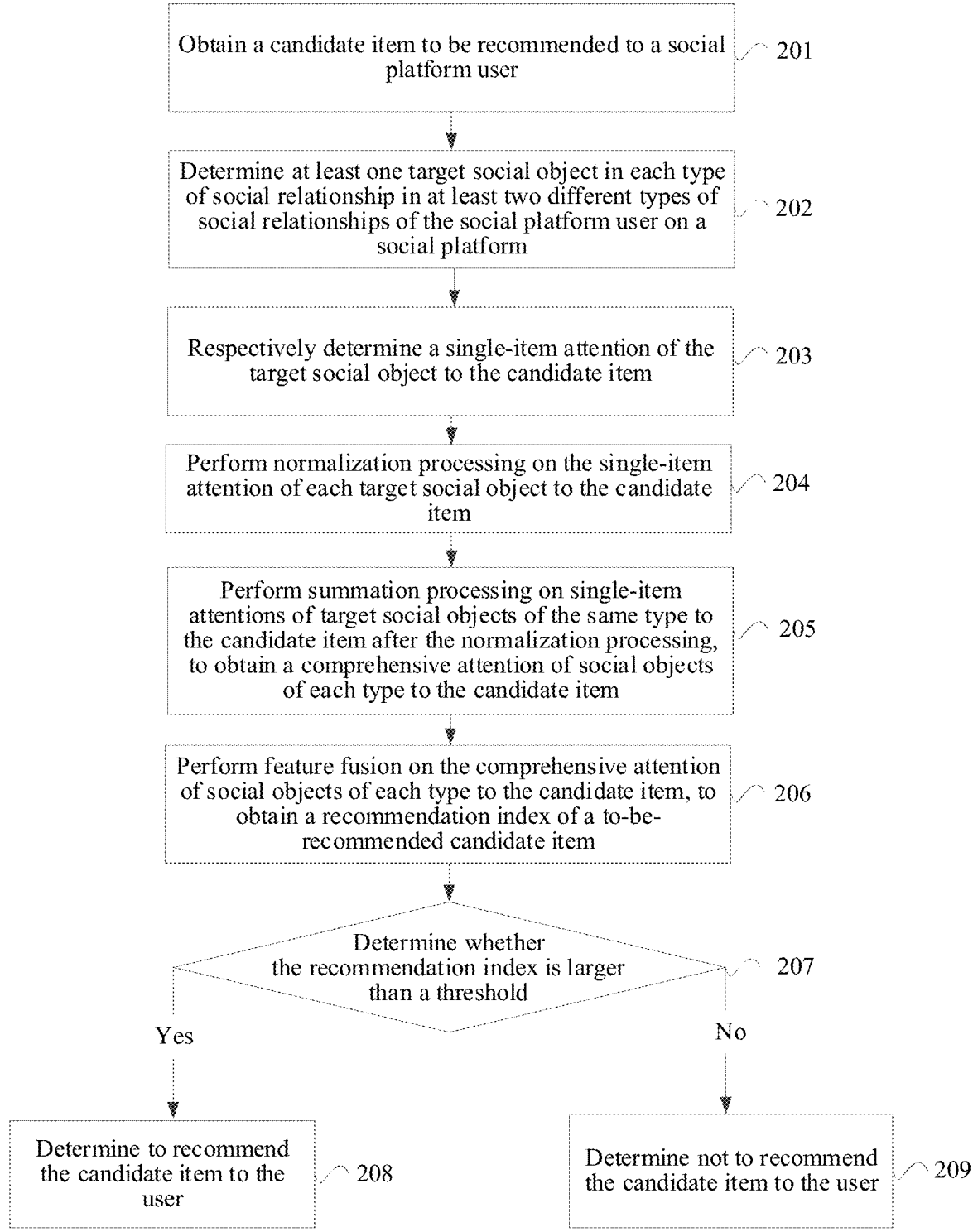
FIG. 2 is a flowchart of a recommendation method according to an embodiment of this application.
Figure 10:
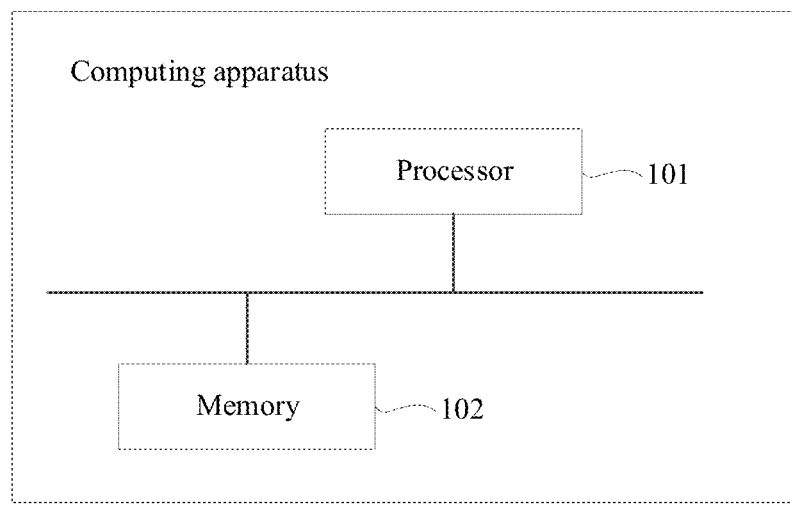
FIG. 10 is a schematic diagram of a computing apparatus according to an embodiment of this application.

As shown in FIG. 2, the item recommendation method provided in this embodiment of this application may be performed by the item recommendation server device shown in FIG. 1, or may be performed by the computing apparatus shown in FIG. 10. The item recommendation method includes the following steps.

In step 201, a candidate item to be recommended to a social platform user is obtained.

In this embodiment of this application, in step 201, the social platform is software, such as WeChat or QQ, used for social activities on the Internet. The candidate item is data information, such as commodities, articles, advertisements, virtual information, or points of interest (POI), used for user consumption, participation, or behavioral interaction on the Internet. A type of the candidate item is not limited in the embodiments of this application, and can be determined according to an actual situation.

In this embodiment of this application, there may be one or more candidate items to be recommended to the social platform user that are obtained in step 201. When there are a plurality of obtained candidate items to be recommended to the social platform user, the types of the plurality of candidate items may be the same or different. This is not specifically limited herein.

In step 202, at least one target social object is determined in each type of social relationships in at least two different types of social relationships of the social platform user on a social platform.

In this embodiment of this application, considering that on the social platform, the social objects having different social relationships with the social platform user (for the convenience of description, the social platform user involved in the following are referred to as a user) have different influences on a behavior of the user. Therefore, when recommending a candidate item to the user, attention information of the social objects having a plurality of different social relationships with the user on the social platform to the candidate item may be comprehensively utilized to improve the accuracy of recommending the candidate item to the user.

Therefore, in step 202, at least two different types of social relationships of the user on the social platform may be determined first, and at least one target social object may be determined from each type of the social relationships. For example, when the social platform is specifically a WeChat platform, the target social object may be a WeChat friend added by the user and having a friend relationship with the user, a WeChat group joined by the user and having a group relationship with the user, a WeChat work contact added by the user and having an enterprise business relationship with the user, or the like.

In this embodiment of this application, considering that a group activity on the social platform is becoming more common, a group member in the group joined by the user on the social platform is usually highly related to a user's preference, such as having a common need or a common feature in some aspects. Therefore, using attention information of the group joined by the user and having the group relationship with the user on social platform to the candidate item can further improve the accuracy of recommending the candidate item to the user.

For example, when the user needs to buy cosmetics and discusses a topic of purchasing cosmetics with a group member in a group related to the theme of cosmetics that the user joins, such as which cosmetic is more suitable for the user. The user purchases the cosmetics according to a suggestion of the group member. For a candidate item related to the cosmetics, using the group related to the theme of cosmetics that the user joins can further improve the accuracy of recommending the candidate item related to the cosmetics to the user.

Therefore, the at least one target social object of the at least two different types of social relationships determined in step 202 includes at least one group joined by the user and having the group relationship with the user on the social platform (also referred to as a group social relationship).

In this embodiment of this application, considering that a friend having a friend relationship with the user on the social platform also has a common need or a common feature with the user in some aspects. Therefore, attention information of the friend added by the user and having the friend relationship with the user on the social platform to the candidate item can further improve the accuracy of recommending the candidate item to the user. Therefore, the at least one target social object of the at least two different types of social relationships determined in step 202 further includes at least one friend added by the user and having the friend relationship with the user on the social platform.

In this embodiment of this application, at least one social target social object of other types of social relationships may further be included. For convenience of description, in the following, an example in which the at least one target social object in the at least two different types of social relationships determined in step 202 includes the at least one group joined by the user and having the group relationship with the user on the social platform and the at least one friend added by the user and having the friend relationship with the user on the social platform is specifically used.

In step 203, a single-item attention of the target social object to the candidate item is respectively determined.

In this embodiment of this application, when the target social object is at least one group joined by the user and having the group relationship with the user, a specific execution process of step 203 can include: first, inputting a vector representation of the at least one group and a vector representation of the candidate item to a first attention model pre-trained, the first attention model being pre-trained with an attention parameter of each group on the social platform to the candidate item; and determining, by the first attention model according to the inputted vector representation of the each group and the vector representation of the candidate item, an attention parameter of the each group to the candidate item; and generating a single-item attention of each group to the candidate item according to the determined attention parameter; and further obtaining a single-item attention of each group to the candidate item in the at least one group that is outputted by the first attention model.

Further, in this embodiment of this application, considering that different group members in the group have different activity levels, and a more active group member has a greater influence and a high importance level on the group. Attention information of the group member of a high importance level in the group to the candidate item has more influence on an interest of the user to the candidate item.

Therefore, in this embodiment of this application, for each group, the first attention model may be further trained with an importance weight of each group member in each group in advance.

Correspondingly, the first attention model may determine the attention parameter of each group to the candidate item according to an inputted vector representation of each group member in the group, and perform weighting processing on the importance weight of each group member in each group and the attention parameter of each group to the candidate item, to generate and output a single-item attention of the group to the candidate item, further to improve the obtained single-item attention of the group to the candidate item, thereby improving the accuracy of recommending the candidate item to the user.

In this embodiment of this application, when the target social object is at least one friend added by the user and having the friend relationship with the user on the social platform, a specific execution process of step 203 further includes: first, inputting a vector representation of the at least one friend and the vector representation of the candidate item to a second attention model pre-trained, the second attention model being pre-trained with an attention parameter of each friend of the social platform to the candidate item; and determining, by the second attention model according to the inputted vector representation of the each friend and the vector representation of the candidate item, an attention parameter of the each friend to the candidate item; and generating and outputting a single-item attention of each friend to the candidate item according to the determined attention parameter, so as to obtain the single-item attention of the each friend to the candidate item that is outputted by the second attention model.

In step 204, normalization processing is performed on the single-item attention of each target social object to the candidate item.

In step 205, summation processing is performed on single-item attentions of target social objects of the same type to the candidate item after the normalization processing, to obtain a comprehensive attention of social objects of each type to the candidate item.

In this embodiment of this application, after the single-item attention of each target social object to the candidate item is respectively determined, normalization processing may be performed on the single-item attention of each target social object to the candidate item, to facilitate a subsequent calculation. Then, for at least one of the foregoing groups, summation processing is performed on a single-item attention of each group to the candidate item after the normalization processing, to obtain a comprehensive attention of the group of the user on the social platform to the candidate item; for the at least one of the foregoing friends, a summation operation is performed on a single-item attention of each friend to the candidate item after the normalization processing, to obtain a comprehensive attention of the friend of the user on the social platform to the candidate item.

In step 206, feature fusion is performed on the comprehensive attention of social objects of each type to the candidate item, to obtain a recommendation index of a to-be-recommended candidate item.

In this embodiment of this application, related feature fusion technology may be used for performing feature fusion on the obtained comprehensive attention of the target social objects of each type to the candidate item. For example, if an additive fusion technology is selected, then the comprehensive attention of the friend of the user on the social platform to the candidate item and the comprehensive attention of the group of the user on the social platform to the candidate item that are obtained above may be used as input parameters of an additive fusion algorithm, thereby obtaining a recommendation index of the to-be-recommended candidate item outputted by the additive fusion algorithm.

The recommendation index may be represented as a star level, a score, and the like.

In step 207, whether the recommendation index is greater than a threshold is determined, and step 208 is performed in a case that the recommendation index is greater than the threshold; and otherwise, step 209 is performed.

In this embodiment of this application, after obtaining the recommendation index of the to-be-recommended candidate item, whether to recommend the candidate item to the social platform user may be further determined according to the recommendation index. Specifically, for example, whether an obtained recommendation index of the to-be-recommended candidate item is greater than the threshold may be determined. For example, when using a score to represent the recommendation index, if the score of the to-be-recommended candidate item is greater than the threshold, step 208 is performed in which a determination is made to recommend the candidate item to the user; otherwise, step 209 is performed in which a determination is made not to recommend the candidate item to the user.

In this embodiment of this application, if there are a plurality of candidate items, a recommendation index corresponding to each candidate item may be obtained according to the method described above. When whether to recommend the candidate item to the social platform user is determined according to the recommendation index, a candidate item recommended to the user may be determined, directly according to the recommendation index corresponding to each candidate item, as a candidate item with the highest recommendation index, or the candidate items may be ranked in descending order according to the recommendation index and be recommended to the user after ranking.

According to the foregoing method, when a candidate item to be recommended to a social platform user is obtained, for at least one target social object in each type of social relationship in at least two different types of social relationships of the user on a social platform, a single-item attention of each target social object to the candidate item is respectively determined. That is to make full use of attention information of the social objects having a plurality of social relationships with the user on the social platform to the candidate item. Then, a comprehensive attention of target social objects of different types to the candidate item is determined according to the single-item attention of each target social object to the candidate item. The single-item attention of each target social object to the candidate item is obtained by the attention model training based on the attention mechanism. That is, the learning advantage of the attention mechanism is fully utilized to accurately learn the single-item attention of each target social object to the candidate item. Then whether to recommend the candidate item to the social platform user is determined according to the comprehensive attention. Therefore, the accuracy of recommending an item to the user can be improved, thereby improving user experience.

In an implementation, in step 202, considering that in actual application, a social object that frequently socializes with the user usually has a greater influence on the user's behavior than an object that occasionally socialize with the user. If attention information of the social object that frequently socializes with the user to the candidate item, both the accuracy of recommending the candidate item to user and a data processing speed can be improved. Therefore, at least one target social object determined in each type of the social relationships in step 202 may be an object that frequently socializes with the user in a corresponding type of the social relationships.

In this embodiment of this application, the method for determining the object that frequently socializes with the user may be determined by using the quantity of times of social interactions with the user within a preset time period. For example, if the quantity of times that the social object socializes with the user (including social activities such as sending and receiving messages and sharing based on the social platform) reaches the threshold in a week, the object is considered to be the object that frequently socializes with the user.

Further, considering that using attention information of an object associated with the candidate item in the social objects to the candidate item is more helpful to improve the accuracy of recommending the candidate item to the user than using attention information of an object not associated with the candidate item in the social objects to the candidate item. Therefore, the at least one target social object determined in each type of the social relationships in step 202 may alternatively be an object associated with the candidate item in the corresponding type of the social relationships. "Being associated with" means that the social object has interaction with the candidate item, such as using or following the candidate item.

In a solution, in this embodiment of this application, the at least one target social object determined in each type of the social relationships in step 202 may alternatively be an object that frequently socializes with the user and is associated with the candidate item. In a solution, in this embodiment of this application, the at least one target social object determined in each type of the social relationships in step 202 may alternatively be all social objects or some randomly selected social objects in the corresponding type of the social relationships.

Further, in this embodiment of this application, the foregoing item recommendation method may be completed based on the item recommendation model. The item recommendation model includes the pre-trained first attention model and the pre-trained second attention model described above. Specifically, a social platform user of a to-be-recommended item and a candidate item to be recommended to the social platform user may be inputted to the item recommendation model, and after the item recommendation method in the foregoing embodiment is performed by using the item recommendation model, a result of whether to recommend the candidate item to the social platform user is outputted. When there are a plurality of inputted candidate items in the item recommendation model, the outputted result of whether to recommend the candidate item to the social platform user may be to recommend the candidate item with the highest recommendation index, or the candidate items may be ranked in descending order according to the recommendation index and to be recommended to the user after ranking. When there is one inputted candidate item in the item recommendation model, the outputted result of whether to recommend the candidate item to the social platform user may be a result of recommending the candidate item to the social platform user or a result of not recommending the candidate item to the social platform user.

That is, the foregoing step 201 to step 209 in this embodiment of this application, that is, the item recommendation method, may be implemented by using the item recommendation model. The item recommendation model may be supported by the item recommendation server device in the application scenario shown in FIG. 1. The following describes an algorithm of the item recommendation model in detail.

Figure 3:
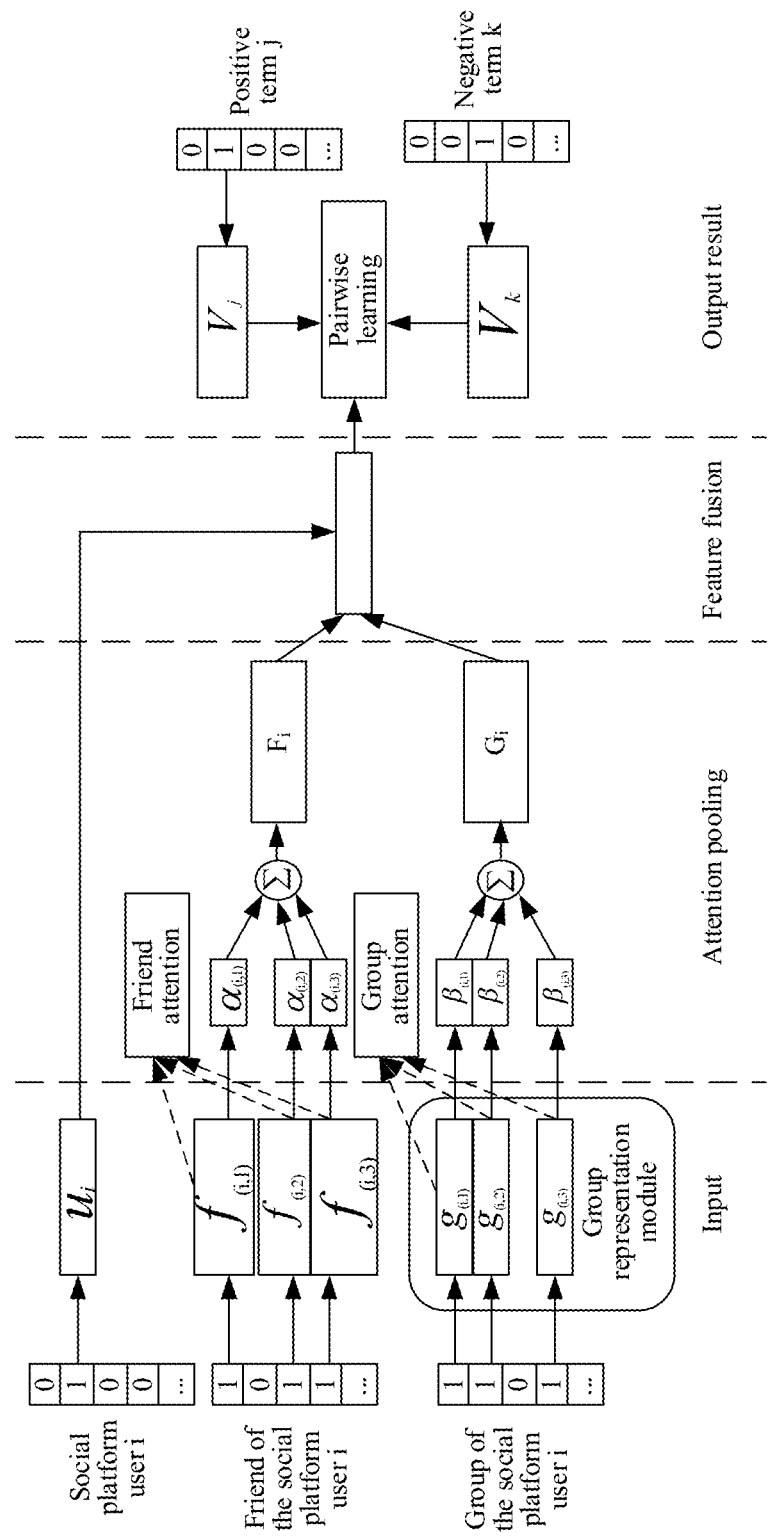
FIG. 3 is a schematic structural diagram of an item recommendation model according to an embodiment of this application.

FIG. 3 is a schematic structural diagram of an item recommendation model according to an embodiment of this application. At least one group joined by a user and having a group relationship with the user on a social platform and at least one friend added by the user and having a friend relationship with the user on the social platform are used as an example for description.

The item recommendation model may be supported by an item recommendation server device, and an input of the item recommendation model includes a user of a to-be-recommended-item on the social platform, at least one group joined by the user and having the group relationship with the user on the social platform, and at least one friend added by the user and having the friend relationship with the user on the social platform.

Figure 4:
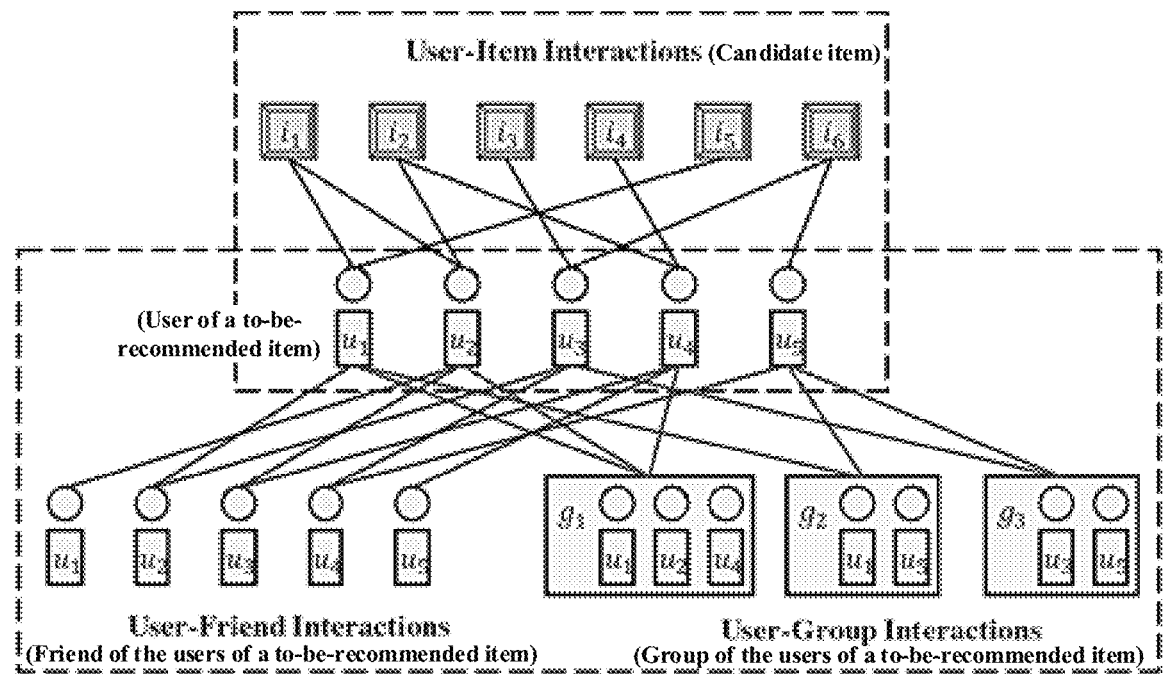
FIG. 4 is a schematic interaction diagram of a WeChat user and a friend, a group, and a to-be-recommended candidate item according to an embodiment of this application.

As shown in FIG. 4, in an exemplary application, the social platform includes a plurality of users, and each user may be the user of a to-be-recommended-item. A set, such as U={u1, u2, un}, may be used in advance to represent a plurality of users of a to-be-recommended item on the social platform. Another set, such as I={i1, i2, . . . , im}, may be used to represent m to-be-recommended items. Still another set, such as G={g1, g2, . . . , gs} may be used to represent s groups on the social platform, where each of the groups includes a plurality of group members, and each of the group members may be the user on the social platform. In this way, each of the users of the to-be-recommended item shown in FIG. 4 includes, on the social platform, the at least one group joined by the user and having the group relationship with the user, and the at least one friend added by the user and having the friend relationship with the user. That is, each of the users of the to-be-recommended item has three observable interactions between the user and the item, the group, and the friend on the social platform.

Therefore, a matrix, such as $X=[x_{ik}]_n{*}_n$, may be used to represent an interaction between each of the users of the to-be-recommended item and the friend thereof. A matrix, such as $R=[r_{ij}]_n{*}_m$, may be used to represent an interaction between each of the users of the to-be-recommended item and the to-be-recommended item. A matrix, such as $Y=[Y_{il}]_n{*}_s$, may also be used to represent an interaction of each of the users of the to-be-recommended item and the group. The foregoing interactions may be stored in a back-end server device of the social platform, and the item recommendation service may communicate with the back-end server device of the social platform. For any one of the users of the to-be-recommended item on the social platform, the item recommendation service calls the foregoing interactions stored in the back-end server device of the social platform, to obtain interaction information of the friend, the group, and the item corresponding to the user of the to-be-recommended item. Then, based on the obtained interaction information, the user, the friend of the user, and the group of the user are used as inputs of the item recommendation model, to obtain a candidate item recommended to the user by using training of the item recommendation model.

User i shown in FIG. 3 represents a social platform user i. Friends of User i represents at least one friend of the social platform user i. Groups of User i represents at least one group of the social platform user i. Attentional Pooling represents attention pooling, which is used to obtain a comprehensive attention of the group to the candidate item and a comprehensive attention of the friend to the candidate item. Feature Fusion represents feature fusion, and Prediction represents an outputted result.

In the item recommendation model, a sequence formed by binary numbers 1 and 0 is used to represent a social platform user $u_i$ of a to-be-recommended item. The sequence includes one binary number 1, and the 1 represents a position of the social platform user $u_i$ in the item recommendation model, which means that an item needs to be recommended to the social platform user $u_i$ on the position.

In the item recommendation model, a sequence formed by binary numbers 1 and 0 is used to represent at least one friend $f_{(i,l)}$ of $u_i$ on the social platform, 1 in the sequence $f_{(i,l)}$ represents a position of a friend of the user $u_i$, that is, a user on a position of each 1 in the sequence $f_{(i,l)}$ is the friend of $u_i$. Similarly, a sequence formed by binary numbers 1 and 0 is used to represent at least one group $g_{(i,s)}$ of $u_i$ on the social platform, 1 in the sequence $g_{(i,s)}$ represents a position of a group joined by the user $u_i$, that is, a group on a position of each 1 in the sequence $g_{(i,s)}$ is the group joined by the user $u_i$, where s and l are positive integers greater than or equal to 1.

The processing steps of the item recommendation model shown in FIG. 3 is described in the following with reference to FIG. 4.

In step 1, pre-processing is respectively performed on the binary sequences corresponding to $u_i$ and Step 1 specifically includes, for example, respectively processing the binary sequences corresponding to $u_i$ and $f_{(i,1)}$ by using an embedding layer, to obtain a dense vector respectively corresponding to $u_i$ and $f_{(i,l)}$. In FIG. 4, $f_{(i,1)}$, $f_{(i,2)}$, $f_{(i,3)}$, and the like represent that $f_{(i,l)}$ includes dense vectors corresponding to friends.

The embedding layer converts a positive integer (a subscript) into a dense vector having a fixed size, to facilitate an operation.

In step 2, attention training is performed on the dense vectors $f_{(i,1)}$, $f_{(i,2)}$, $f_{(i,3)}$, and the like corresponding to the friends, to obtain the comprehensive attention of the friends to the candidate item.

Considering that a friend having a friend relationship with the user on the social platform has a common need or a common feature with the user in some aspects, and therefore, the attention training may be performed by using the friends of the user on the social platform in the item recommendation model, to learn an attention of each friend to the candidate item, thereby obtaining a comprehensive attention of the friends having a friend social relationship with the user to the candidate item, to improve the accuracy of recommending the candidate item to the user.

A processing process of obtaining a comprehensive attention of the friends to the candidate item in step 2 can specifically include: (a) Input the dense vectors $f_{(i,1)}$, $f_{(i,2)}$, $f_{(i,3)}$, and the like corresponding to the friends to a second attention model pre-trained, to obtain a single-item attention of each friend to the candidate item outputted by the second attention model.

Figure 5:
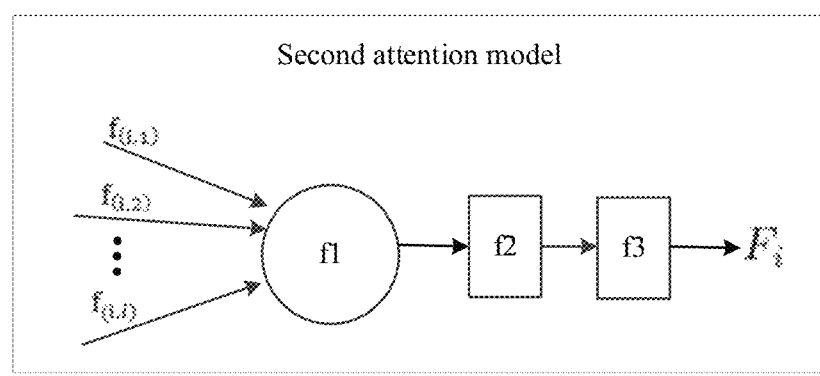
FIG. 5 is a schematic architectural diagram of a second attention model according to an embodiment of this application.

The second attention model is a submodel of the item recommendation model and may be regarded as a functional module of the item recommendation model. The second attention model is pre-trained with an attention parameter of each friend of $u_i$ on the social platform to the candidate item. As shown in FIG. 5, after the dense vectors corresponding to the friends are inputted to the second attention model, the second attention model may determine an attention parameter corresponding to each friend according to the dense vector corresponding to each friend, and then use the determined attention parameter as a parameter to calculate the single-item attention of each friend to the candidate item according to the following formula (1):

$$\alpha^*_{(i,l)} = h_f^T \text{ReLU}(W_{f1} f_{(i,l)} + W_{f2} u_j + b_f) \quad \text{Formula (1)}$$

$f_{(i,l)}$ represents the dense vectors $f_{(i,1)}$, $f_{(i,2)}$, $f_{(i,3)}$, and the like corresponding to the friends, $v_j$ represent the candidate item, and $W_{f1} \in R^{d*k}$, $W_{f2} \in R^{d*k}$, $b_f \in R^k$, and $h_f \in R^k$ are the attention parameters corresponding to the friend $f_{(i,l)}$. Such attention parameters are all pre-trained, k represents a dimension of an attention network, ReLU is a nonlinear activation function, T represents transposition, and f1 in FIG. 5 represents formula (1).

Normalization processing is performed on the obtained single-item attention $\alpha_{(i,l)}^*$ of each friend to the candidate item according to formula (2), to obtain a single-item attention $\alpha_{(i,l)}$ of each friend to the candidate item after the normalization processing:

$$\alpha_{(i,l)} = \frac{\exp(\alpha^*_{(i,l)})}{\sum_j \exp(\alpha^*_{(i,j)})} \quad \text{Formula (2)}$$

j represents all values that need to be normalized, and f2 in FIG. 5 represents formula (2).

(b) Perform a summation operation on the single-item attention of each friend to the candidate item, to obtain a comprehensive attention of the friends to the candidate item.

For example, a summation operation shown in formula (3) may be performed on the single-item attention of each friend to the candidate item that is obtained by using formula (2), to obtain a comprehensive attention $F_i$ of the friends to the candidate item:

$$F_i = \sum_l \alpha_{(i,l)} f_{(i,l)} \quad \text{Formula (3)}$$

$\alpha_{(i,l)}$ is the single-item attention of each friend to the candidate item after the normalization, $f_{(i,l)}$ is a vector representation (dense vector) of each friend, f3 in FIG. 5 represents formula (3).

In step 3, $g_{(i,s)}$ is passed to the pre-trained first attention model for attention training, to obtain a comprehensive attention of a group to the candidate item.

Considering that a group activity on the social platform is becoming more common, and a group member in the group joined by the user on the social platform is usually highly related to a user's preference, and therefore, attention training may be performed by using the group joined by the user on the social platform in the item recommendation model, to learn an attention of each group to the candidate item, thereby obtaining a comprehensive attention of a group having a group social relationship to the candidate item, to further improve the accuracy of recommending the candidate item to the user.

A processing process of obtaining the comprehensive attention of the group to the candidate item in step 3 can specifically include: (a) Preprocess a binary sequence corresponding to $g_{(i,s)}$, to obtain a group dense vector of each group and a dense vector of each group member in each group.

Figure 6:
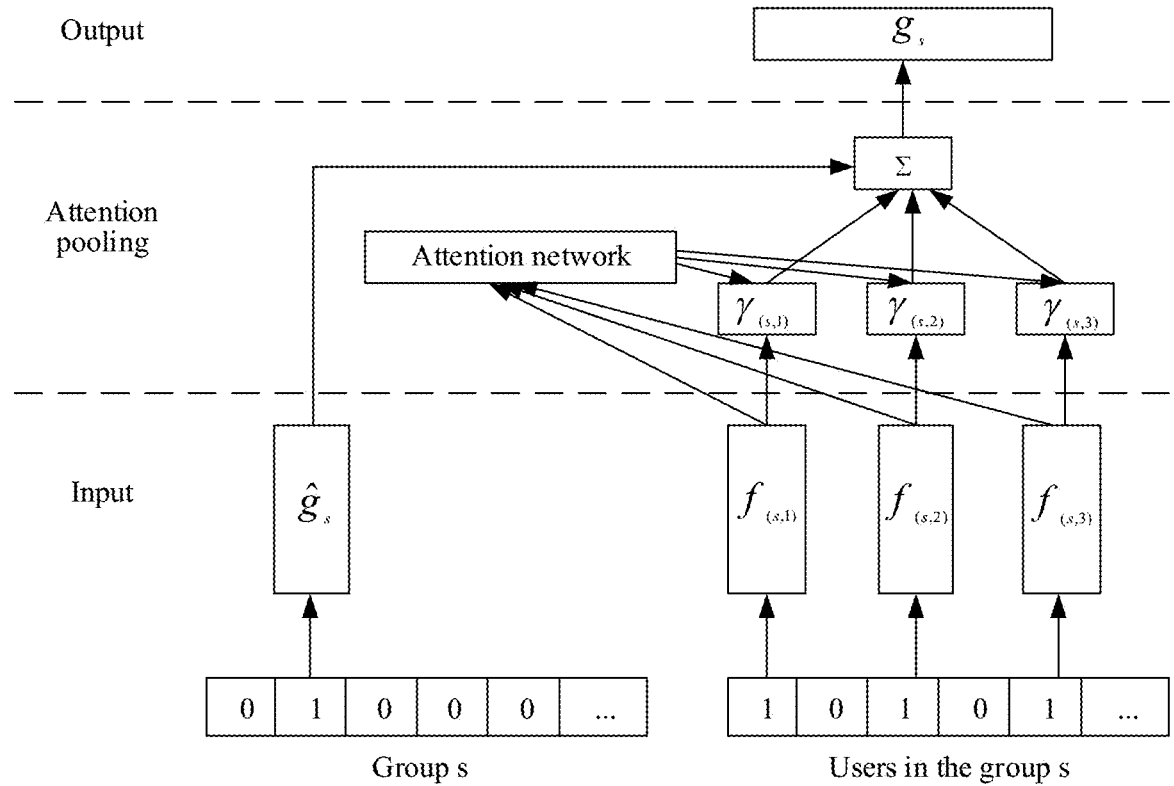
FIG. 6 is a schematic diagram of obtaining an importance weight of each group member of a group according to an embodiment of this application.

As shown in FIG. 6, according to $g_{(i,s)}$, a binary sequence $g_s$ (Group s in FIG. 6) corresponding to each group is obtained, that is, that 1 at a position in which the group is located is kept for each group. 1 at positions in which other groups are located in $g_{(i,s)}$ is set to zero, then each group $g_s$ is processed by using the embedding layer, to obtain the group dense vector $\hat{g}_s$ of each group. $g_s$ is a positive integer sequentially selected from 1, and the maximum value of s is a total number of at least one group joined by the user and having the group relationship with the user on the social platform.

A corresponding binary sequence representing the group member included in each group is processed by using the embedding layer, to obtain the dense vector $f_{(s,k)}$ of each group member in each group. k is a positive integer sequentially selected from 1, and the maximum value of k is a total number of group members in a corresponding group. Users in Group s in FIG. 6 represents the group members included in each group.

(b) For each group, obtain an importance weight of each group member in the group.

Considering that different group members in the group have different activity levels, and a more active group member has a greater influence and a high importance level on the group. Attention information of the group member of a high importance level in the group to the candidate item has more influence on an interest of the user to the candidate item. Therefore, when attention training is performed by using the group, the importance weight of each group member in the group is combined to improve the accuracy of the obtained attention of the group to the candidate item, thereby improving the accuracy of recommending the item to the user.

For each group, the first attention model is trained with the importance weight of each group member in the group. The first attention model is a submodel of the item recommendation model and may be regarded as a functional module of the item recommendation model.

Figure 7:
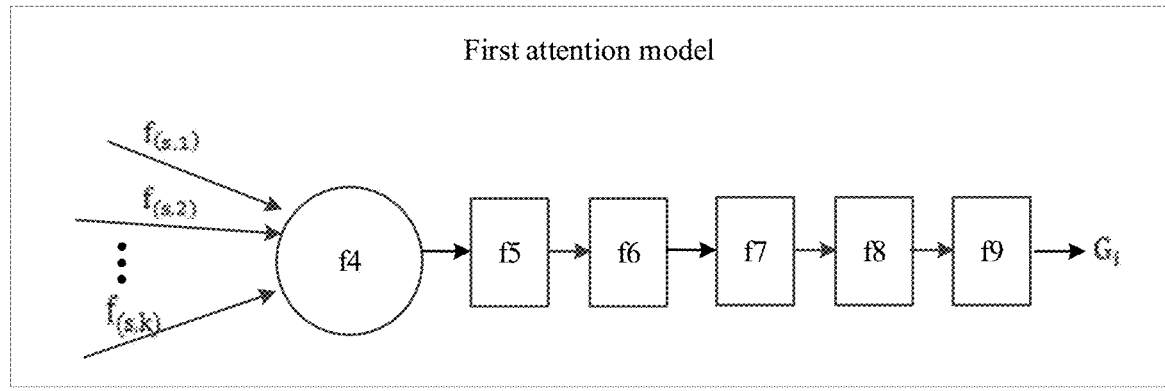
FIG. 7 is a schematic architectural diagram of a first attention model according to an embodiment of this application.

Referring to FIG. 7, the first attention model may generate and output an importance parameter $\gamma_{(s,k)}$ of each group member in the group according to the dense vector $f_{(s,k)}$ of each group member in each group by using the following formula (4) and formula (5) sequentially.

$$\gamma^*_{(s,k)} = h_m^T ReLU(W_m f_{(s,k)} + b_m) \quad \text{Formula (4)}$$

$$\gamma_{(s,k)} = \frac{\exp(\gamma^*_{(s,k)})}{\sum_j \exp(\gamma^*_{(s,k)})} \quad \text{Formula (5)}$$

Formula (5) represents normalization that is performed on a processing result of formula (4). $f_{(s,k)}$ is the dense vector of each group member in the group, T represents transposition, and $h_m$, $W_m$, and $b_m$ are the parameters. Such parameters may be pre-trained. In FIG. 7, f4 represents formula (4), and f5 represents formula (5).

The importance weight $g_s$ of each group member in the group is obtained according to the importance parameter of each group member in the group by using the following formula (6):

$$g_s = \sum_k \gamma_{(s,k)} f_{(s,k)} + \hat{g}_s \quad \text{Formula (6)}$$

k is a positive integer sequentially selected from 1, and the maximum value of k is a total number of group members in a corresponding group. $f_{(s,k)}$ is a vector representation of each group member in the group, that is, a group member dense vector. $\gamma_{(s,k)}$ is a weight parameter of a corresponding group member. $\hat{g}_s$ is a vector representation of the group, that is, a group dense vector. f6 in FIG. 7 represents formula (6).

(c) Obtain an attention parameter of each group to the candidate item, and perform a weighting operation on an attention parameter of the each group member to the candidate item according to the importance weight of each group member in the group, to obtain a single-item attention of each group to the candidate item.

The first attention model is pre-trained with an attention parameter of each group on the social platform to the candidate item. Therefore, the first attention model may first determine the attention parameter of each group to the candidate item, and then generate and output the single-item attention $\beta_{(i,s)}$ of each group to the candidate item by using formula (7) and formula (8) sequentially:

$$\beta^*_{(i,s)} = h_g^T ReLU(W_{g1} g_{(i,s)} + W_{g2} v_j + b_g) \quad \text{Formula (7)}$$

$$\beta_{(i,s)} = \frac{\exp(\beta^*_{(i,s)})}{\sum_j \exp(\beta^*_{(i,j)})} \quad \text{Formula (8)}$$

Formula (8) represents normalization processing that is performed on a calculation result of formula (7). $W_{g1} \in R^{d*k}$, $W_{g2} \in R^{d*k}$, $b_g \in R^k$, and $h_g \in R^k$ are the parameters of the group to the candidate item, and such parameters are pre-trained in the first attention model. $g_{(i,1)}$, $g_{(i,2)}$, $g_{(i,3)}$ ... $g_{(i,s)}$ in formula (7) respectively represent the importance weight $g_s$ of each group member in the group obtained by using formula (6), that is, $g_{(i,1)}$ represents $g_1$, $g_{(i,2)}$ represents $g_2$, and so on. In FIG. 7, f7 represents formula (7), and f8 represents formula (8).

(d) Perform a summation operation on the single-item attention of each group to the candidate item, to obtain a comprehensive attention of the group to the candidate item.

For example, a summation operation shown in formula (9) may be performed on the single-item attention $\beta_{(i,s)}$ of each group to the candidate item that is obtained by using formula (8), to obtain the comprehensive attention $G_i$ of the group to the candidate item:

$$G_i = \sum_s \beta_{(i,s)} g_{(i,s)} \quad \text{Formula (9)}$$

$\beta_{(i,s)}$ represents the single-item attention of each group to the candidate item, $g_{(i,s)}$ represents a vector representation of each group, that is, a group dense vector. s is a positive integer sequentially selected from 1, and the maximum value of s is a total number of at least one group joined by the user and having the group relationship with the user on the social platform. f9 in FIG. 7 represents formula (9).

In step 4, feature fusion is performed on the comprehensive attention of the friend to the candidate item and the comprehensive attention of the group to the candidate item, to obtain a score of recommending the candidate item.

A feature fusion technology may be an additive fusion technology or another type of fusion technology. The additive fusion technology is used herein as an example of which additive feature fusion may be performed, by using the following formula (10), on the comprehensive attention $F_i$ of the friend to the candidate item and the comprehensive attention $G_i$ of the group to the candidate item, to generate a score that represents a preference of the user to the candidate item. The score is used for representing a recommendation index for recommending the candidate item to the social platform user $u_i$:

$$\bar{r}_{ij} = (u_i + F_i + G_i)^T v_j \quad \text{Formula (10)}$$

$v_j$ is a vector representation of the candidate item, $F_i$ represents the comprehensive attention of the friend to the candidate item, $G_i$ represents the comprehensive attention of the group to the candidate item, and T represents transposition.

In step 5, a determination is made, according to the obtained score of the to-be-recommended candidate item, of whether to recommend the candidate item to the social platform user.

The step can specifically include: when one candidate item is inputted, after obtaining, according to the foregoing step 1 to step 4, a score of recommending the candidate item, whether the score is greater than a recommendation threshold may be determined. A result of recommending the candidate item $v_j$ to the social platform user $u_i$ is outputted in a case that the score is greater than the recommendation threshold; otherwise, a result of not recommending the candidate item $v_j$ to the social platform user $u_i$ is outputted.

When there are a plurality of inputted candidate items, after obtaining, according to the foregoing step 1 to step 4, the score of recommending each candidate item, a result of recommending a candidate item having the highest score to the social platform user $u_i$ may be outputted, or each candidate item may be ranked in descending order according to the scores, and a result of recommending the ranked candidate items to the user may be outputted.

Based on the foregoing embodiment, it can be seen that the item recommendation method in this embodiment of this application can be performed by using the item recommendation model. An item recommended to a user of a to-be-recommended item is obtained by processing a user of a to-be-recommended item and each to-be-recommended item by using the item recommendation model. The item recommendation model needs to be trained before application, and a good model usually needs a good training sample. Therefore, in this embodiment of this application, a process may further be performed for original data, to obtain a more reliable training sample. The accuracy of the item recommendation model may be improved by training and optimizing the item recommendation model in a plurality of scenarios based on different training samples. The following specifically describes a training process of the item recommendation model in this embodiment of this application:

The training process is generally performed by a back-end server device. The training of each module of the model may be complex and have a large computing amount. Therefore, the training process is implemented by using the back-end server device, so as to apply a trained model and result to each smart terminal, thereby accurately recommending the item to the user of a to-be-recommended item.

When training and optimizing the item recommendation model in a plurality of scenarios based on different training samples, the item recommendation model may be optimized according to the following formula (11):

$$L_{BPR} = \sum_{(i,j,k) \in \mathcal{D}} -\ln \sigma(\bar{r}_{ij} - \bar{r}_{ik}) + \lambda_\Theta (\|\Theta\|^2) \quad \text{Formula (11)}$$

j represents the candidate item (that is $v_j$ in the above). i represents the user (that is $u_i$ in the above). k represents a random sample negative term. $\bar{r}_{ij}$ represents a recommendation score of the recommended candidate item. $L_{BPR}$ represents an arrangement loss. $\bar{r}_{ik}$ represents a random sample negative term for the user i. $\lambda_\Theta(\|\Theta\|^2)$ represents a regular term used for preventing overfitting. D represents a sample set.

Therefore, when the item recommendation method in this embodiment of this application is performed by using the item recommendation model, the single-item attention of each target social object to the candidate item can be accurately learned or determined, and the purpose of more accurately recommending the item to the user of a to-be-recommended item is implemented according to the comprehensive attention. So that the accuracy of recommending the item to the user can be improved, thereby improving user experience.

In the following, for the same social platform user of a to-be-recommended item, recommendation accuracy evaluation is respectively performed, by using a related item recommendation accuracy evaluation method, on items recommended to the user that is obtained based on the item recommendation method in this embodiment of this application and based on a plurality of related recommendation methods. The related item recommendation accuracy evaluation method can use the Recall evaluation method, and the evaluation method is shown in formula (12):

$$\text{Recall}@K = \frac{\sum_{j=1}^{K} rel_j}{\min(K, |y_u^{test}|)} \quad \text{Formula (12)}$$

k represents a total number of items recommended to the user that is obtained by using each algorithm, $rel_j$ has a value of 0 or 1, which represents whether a $j^{th}$ item is in a push list of a test set, and if the $j^{th}$ item is in the push list, the value of $rel_j$ is 1; and otherwise, the value of $rel_j$ is 0. $y_u^{test}$ represents a total number of candidate items evaluated by a user u in the test set.

The related item recommendation accuracy evaluation method may also use the Normalized Discounted Cumulative Gain evaluation method, that is, the NDCG evaluation method, and the evaluation method is shown in formula (13) and formula (14):

$$DCG@K = \sum_{j=1}^{K} \frac{2^{rel_j} - 1}{\log_2(j+1)} \quad \text{Formula (13)}$$

$$NDCG@K = \frac{DCG@K}{IDCG@K} \quad \text{Formula (14)}$$

k represents a total number of items recommended to the user that is obtained by using each algorithm, $rel_j$ has the value of 0 or 1, which represents whether the $j^{th}$ item is in the push list of the test set, and if the $j^{th}$ item is in the push list, the value of $rel_j$ is 1.

Figures 8, 9:
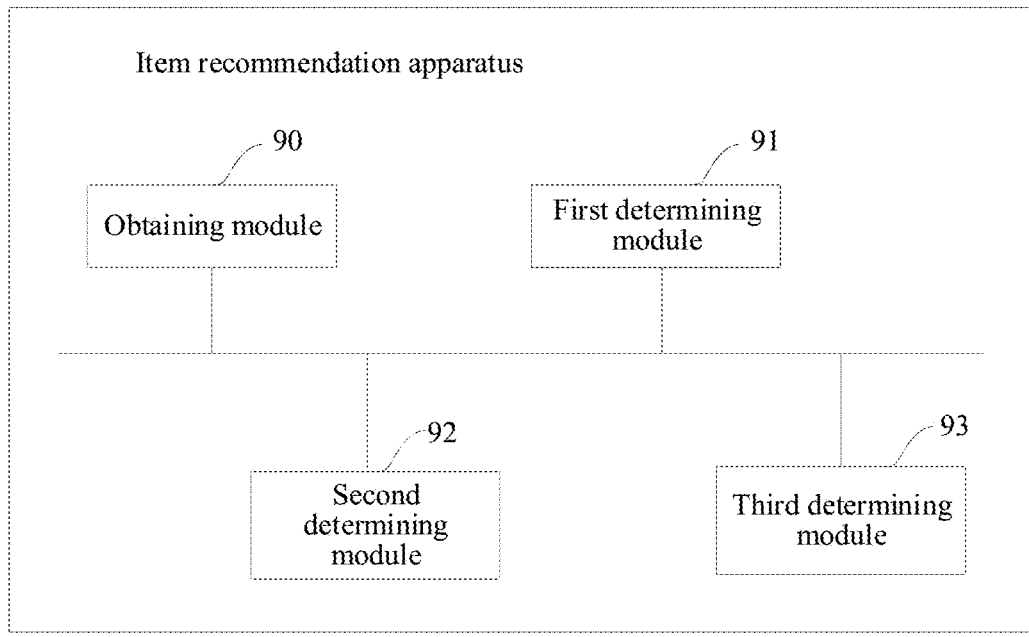
FIG. 8 is a schematic diagram of an accuracy estimation result to a recommended item according to an embodiment of this application.
FIG. 9 is a schematic diagram of a recommendation apparatus according to an embodiment of this application.

As shown in FIG. 8, in this embodiment of this application, both the Recall evaluation method and the NDCG evaluation method are used to perform the recommendation accuracy evaluation on items recommended to the user that is obtained by using the item recommendation method in this embodiment of this application, a related recommendation method such as a most popular (MP) method, an Item KNN method, a BPR method, a neural collaborative filtering (NCF) method, an SBPR method, or an SAMN method shown in FIG. 8.

In FIG. 8, the SACF is used to represent the item recommendation method in this embodiment of this application. From an evaluation result of each recommendation method shown in FIG. 8, it can be seen that, first, an effect of the MP method is not good, which indicates that it is more important to model user's preference rather than merely recommend popular items to the user. Secondly, the accuracy of recommending an item to the user that is obtained by using the item recommendation method SACF in this embodiment of this application is higher than that of a plurality of the related recommendation methods. It can be seen from FIG. 8 that, by using the Recall@10 evaluation method, performances of the SACF method provided in this embodiment of this application on two data sets (WeChat-10k and WeChat-100k) are improved by about 3.67% and 5.01% respectively compared with that of the SAMN method. By using the NDCG@10 evaluation method, performances of the SACF method provided in this embodiment of this application on the two data sets are improved by about 4.17% and 5.49% compared with that of the SAMN method. Therefore, the item recommendation method in this embodiment of this application implements the purpose of accurately recommending the item to the user of a to-be-recommended item, avoids recommending an item that the user is not interested in to the user of a to-be-recommended item, and improves the resource utilization and user experience.

Based on the same idea, this embodiment of this application provides an item recommendation apparatus shown in FIG. 9, including, for example, an obtaining module 90, a first determining module 91, a second determining module 92, and a third determining module 93. One or more of the modules can be implemented by processing circuitry, software, or a combination thereof, for example.

The obtaining module 90 is configured to obtain a candidate item to be recommended to a social platform user. The first determining module 91 is configured to respectively determine, for at least one target social object in each type of social relationship in at least two different types of social relationships of the social platform user on a social platform, a single-item attention of each target social object to the candidate item. The second determining module 92 is configured to determine, according to the single-item attention of each target social object to the candidate item, a comprehensive attention of target social objects of different types to the candidate item. The third determining module 93 is configured to determine, according to the comprehensive attention, whether to recommend the candidate item to the social platform user.

The social relationships of different types include a group relationship, and the at least one target social object in the social relationship includes at least one group joined by the social platform user on the social platform.

The first determining module is configured to input a vector representation of the at least one group and a vector representation of the candidate item to a first attention model pre-trained, the first attention model being pre-trained with an attention parameter of each group on the social platform to the candidate item. The first determining module is configured to obtain a single-item attention of each group to the candidate item that is outputted by the first attention model, the single-item attention being a single-item attention of each group to the candidate item that is generated and outputted by the first attention model according to an attention parameter of the each group to the candidate item determined according to the vector representation of the each group and the vector representation of the candidate item.

For each group, the first attention model is trained with an importance weight of each group member in the group. The single-item attention of each group to the candidate item that is outputted by the first attention model is obtained by further performing weighting processing on the importance weight of the each group member in the each group and the attention parameter of the each group to the candidate item.

The social relationships of different types include a friend relationship, and the at least one target social object in the social relationships includes at least one friend added by the social platform user on the social platform.

The first determining module is further configured to input a vector representation of the at least one friend and the vector representation of the candidate item to a second attention model pre-trained, the second attention model being pre-trained with an attention parameter of each friend on the social platform to the candidate item. The first determining module is further configured to obtain a single-item attention of each friend to the candidate item that is outputted by the second attention model, the single-item attention being a single-item attention of each friend to the candidate item that is generated by the second attention model according to an attention parameter of the each friend to the candidate item determined according to the vector representation of the each friend and the vector representation of the candidate item.

The second determining module is configured to perform normalization processing on the single-item attention of each target social object to the candidate item. The second determining module is configured to perform summation processing on single-item attentions of target social objects of the same type to the candidate item after the normalization processing, to obtain a comprehensive attention of social objects of each type to the candidate item.

The third determining module is configured to perform feature fusion on the comprehensive attention of social objects of each type to the candidate item, to obtain a recommendation index for recommending the candidate item. The third determining module is configured to determine, according to the recommendation index, whether to recommend the candidate item to the social platform user.

Based on the same idea, this embodiment of this application provides a computing apparatus, as shown in FIG. 10, including processing circuitry such as at least one processor 101 and at least one memory 102, the memory 102 storing a computer program, the program, when executed by the processor 101, causing the processor 101 to perform the operations of the foregoing item recommendation method.

Based on the same idea, this embodiment of this application provides a storage medium such as a non-transitory computer-readable storage medium, storing computer instructions, the computer instructions, when run on a computer, causing the computer to perform the operations of the foregoing item recommendation method.

A person skilled in the art can understand that the embodiments of this application may be provided as a method, a system, or a computer program product. Therefore, this application may use a form of hardware-only embodiments, software-only embodiments, or embodiments combining software and hardware. In addition, this application may use a form of a computer program product that is implemented on one or more computer-usable storage media (including but not limited to a disk memory, an optical memory, and the like) that include a computer-usable program code.

This application is described according to the flowcharts and/or block diagrams of the method, the device (system), and the computer program product according to the embodiments of this application. It may be understood that, computer program instructions can implement each procedure and/or block in the flowcharts and/or block diagrams, and a combination of procedures and/or blocks in the flowcharts and/or block diagrams. Such computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a specified function in one or more procedures in the flowcharts and/or in one or more blocks in the block diagrams.

Such computer program instructions may also be stored in a computer-readable memory such as a non-transitory computer-readable storage medium that can guide a computer or another programmable data processing device to work in a specified manner, so that the instructions stored in the computer-readable memory generate a product including an instruction apparatus, where the instruction apparatus implements a function specified in one or more procedures in the flowcharts and/or one or more blocks in the block diagrams.

Such computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or one or more blocks in the block diagrams.

A person skilled in the art can make various modifications and variations to this application without departing from the spirit and scope of this application. In this case, if the modifications and variations made to this application fall within the scope of the claims of this application and equivalent technologies thereof, this application is intended to include these modifications and variations.

What is claimed is:

1. A recommendation method, comprising:
    obtaining a candidate item to be recommended to a social network user, the social network user having at least two different types of relationships in one or more online social networks;
    determining, for each social object of two or more social objects having relationships with the social network user, attention of the social object having a relationship with the social network user to the candidate item in the one or more online social networks, wherein a first social object of the two or more social objects is a group joined by the social network user in a social network and the determined attention of the first social object to the candidate item is based on an importance weight of at least one group member in the group;
    determining, by processing circuitry and according to the attention of each of the two or more social objects having relationships with the social network user to the candidate item, a comprehensive attention of the two or more social objects to the candidate item in the one or more online social networks, wherein the determined comprehensive attention is a summation of the determined attention of the first social object and the determined attentions of other social objects of the two or more social objects to the candidate item; and
    determining, according to the determined comprehensive attention, whether to recommend the candidate item to the social network user through the one or more online social networks.

2. The method according to claim 1, wherein the first social object has a group relationship with the social network user in the social network.

3. The method according to claim 2, wherein the determining the attention of the first social object comprises:
    inputting a vector representation of the group joined by the social network user and a vector representation of the candidate item to a first attention model, the first attention model being pre-trained with an attention parameter of the group on the social network to the candidate item; and
    obtaining attention information of the group to the candidate item that is outputted by the first attention model, the attention information of the group indicating an attention of the group to the candidate item that is generated and outputted by the first attention model according to the attention parameter of the group to the candidate item determined according to the vector representation of the group and the vector representation of the candidate item.

4. The method according to claim 3, wherein for the group, the first attention model is pre-trained with an importance weight of each group member in the group; and
    the attention information of the group to the candidate item that is outputted by the first attention model is obtained by further performing weighting processing using the importance weight of each group member in the group and the attention parameter of the group to the candidate item.

5. The method according to claim 2, wherein a second social object of the two or more social objects has a friend relationship with the social network user, and the second social object is a friend added by the social network user on the social network.

6. The method according to claim 5, wherein the determining the attention of the second social object further comprises:
    inputting a vector representation of the friend and a vector representation of the candidate item to a second attention model, the second attention model being pre-trained with an attention parameter of each friend on the social network to the candidate item; and
    obtaining attention information of the friend to the candidate item that is outputted by the second attention model, the attention information of the friend indicating an attention of the friend to the candidate item that is generated by the second attention model according to the attention parameter of the friend to the candidate item determined according to the vector representation of the friend and the vector representation of the candidate item.

7. The method according to claim 1, wherein
    the determining the comprehensive attention includes:
    performing normalization processing on the attention of each of the two or more social objects having relationships with the social network user to the candidate item; and
    performing summation processing on attentions of social objects of the same type to the candidate item after the normalization processing, to obtain the comprehensive attention as attentions of social objects of each type to the candidate item; and the determining whether to recommend includes:
determining a recommendation index for recommending the candidate item based on the comprehensive attention to the candidate item; and
determining, according to the recommendation index, whether to recommend the candidate item to the social network user.

8. A recommendation apparatus, comprising:
processing circuitry configured to:
obtain a candidate item to be recommended to a social network user, the social network user having at least two different types of relationships in one or more online social networks;
determine, for each social object of two or more social objects having relationship with the social network user, attention of the social object having a relationship with the social network user to the candidate item in the one or more online social networks, wherein a first social object of the two or more social objects is a group joined by the social network user in a social network and the determined attention of the first social object to the candidate item is based on an importance weight of at least one group member in the group;
determine, according to the attention of each of the two or more social objects having relationships with the social network user to the candidate item, a comprehensive attention of the two or more social objects to the candidate item in the one or more online social networks, wherein the determined comprehensive attention is a summation of the determined attention of the first social object and the determined attentions of other social objects of the two or more social objects to the candidate item; and
determine, according to the determined comprehensive attention, whether to recommend the candidate item to the social network user through the one or more online social networks.

9. The recommendation apparatus according to claim 8, wherein the first social object has a group relationship with the social network user in the social network.

10. The recommendation apparatus according to claim 9, wherein the processing circuitry is configured to:
input a vector representation of the group joined by the social network user and a vector representation of the candidate item to a first attention model, the first attention model being pre-trained with an attention parameter of the group on the social network to the candidate item; and
obtain attention information of the group to the candidate item that is outputted by the first attention model, the attention information of the group indicating an attention of the group to the candidate item that is generated and outputted by the first attention model according to the attention parameter of the group to the candidate item determined according to the vector representation of the group and the vector representation of the candidate item.

11. The recommendation apparatus according to claim 10, wherein for the group, the first attention model is pre-trained with an importance weight of each group member in the group; and
the attention information of the group to the candidate item that is outputted by the first attention model is obtained by further performing weighting processing using the importance weight of each group member in the group and the attention parameter of the group to the candidate item.

12. The recommendation apparatus according to claim 9, wherein a second social object of the two or more social objects has a friend relationship with the social network user, and the second social object is a friend added by the social network user on the social network.

13. The recommendation apparatus according to claim 12, wherein the processing circuitry is configured to:
input a vector representation of the friend and a vector representation of the candidate item to a second attention model, the second attention model being pre-trained with an attention parameter of each friend on the social network to the candidate item; and
obtain attention information of the friend to the candidate item that is outputted by the second attention model, the attention information of the friend indicating an attention of the friend to the candidate item that is generated by the second attention model according to the attention parameter of the friend to the candidate item determined according to the vector representation of the friend and the vector representation of the candidate item.

14. The recommendation apparatus according to claim 8, wherein the processing circuitry is configured to:
perform normalization processing on the attention of each of the two or more social objects having relationships with the social network user to the candidate item;
perform summation processing on attentions of social objects of the same type to the candidate item after the normalization processing, to obtain the comprehensive attention as attentions of social objects of each type to the candidate item;
determine a recommendation index for recommending the candidate item based on the comprehensive attention to the candidate item; and
determine, according to the recommendation index, whether to recommend the candidate item to the social network user.

15. A non-transitory computer-readable storage medium storing instructions which when executed by at least one processor cause the at least one processor to perform:
obtaining a candidate item to be recommended to a social network user, the social network user having at least two different types of relationships in one or more online social networks;
determining, for each social object of two or more social objects having relationships with the social network user, attention of the social object having a relationship with the social network user to the candidate item in the one or more online social networks, wherein a first social object of the two or more social objects is a group joined by the social network user in a social network and the determined attention of the first social object to the candidate item is based on an importance weight of at least one group member in the group;
determining, according to the attention of each of the two or more social objects having relationships with the social network user to the candidate item, a comprehensive attention of the two or more social objects to the candidate item in the one or more online social networks, wherein the determined comprehensive attention is a summation of the determined attention of the first social object and the determined attentions of other social objects of the two or more social objects to the candidate item; and determining, according to the determined comprehensive attention, whether to recommend the candidate item to the social network user through the one or more online social networks.

16. The non-transitory computer-readable storage medium according to claim 15, wherein the first social object has a group relationship with the social network user in the social network.

17. The non-transitory computer-readable storage medium according to claim 16, wherein the determining the attention of the first social object comprises:
inputting a vector representation of the group joined by the social network user and a vector representation of the candidate item to a first attention model, the first attention model being pre-trained with an attention parameter of the group on the social network to the candidate item; and
obtaining attention information of the group to the candidate item that is outputted by the first attention model, the attention information of the group indicating an attention of the group to the candidate item that is generated and outputted by the first attention model according to the attention parameter of the group to the candidate item determined according to the vector representation of the group and the vector representation of the candidate item.

18. The non-transitory computer-readable storage medium according to claim 17, wherein for the group, the first attention model is pre-trained with an importance weight of each group member in the group; and
the attention information of the group to the candidate item that is outputted by the first attention model is obtained by further performing weighting processing using the importance weight of each group member in the group and the attention parameter of the group to the candidate item.

19. The non-transitory computer-readable storage medium according to claim 16, wherein a second social object of the two or more social objects has a friend relationship with the social network user, and the second social object is a friend added by the social network user on the social network.

20. The non-transitory computer-readable storage medium according to claim 19, wherein the determining the attention of the second social object further comprises:
inputting a vector representation of the friend and a vector representation of the candidate item to a second attention model, the second attention model being pre-trained with an attention parameter of each friend on the social network to the candidate item; and
obtaining attention information of the friend to the candidate item that is outputted by the second attention model, the attention information of the friend indicating an attention of the friend to the candidate item that is generated by the second attention model according to the attention parameter of the friend to the candidate item determined according to the vector representation of the friend and the vector representation of the candidate item.

* * * * *